US009221047B2

(12) United States Patent
Ferraro et al.

(10) Patent No.: US 9,221,047 B2
(45) Date of Patent: Dec. 29, 2015

(54) DEVICE FOR CONTROLLED DISTRIBUTION OF MICRO- OR NANO-VOLUMES OF A LIQUID BASED ON THE PIEZOELECTRIC EFFECT IN FUNCTIONALIZED MATERIALS, WITHOUT USING EXTERNAL ELECTRIC SOURCES

(75) Inventors: Pietro Ferraro, Pozzuoli (IT); Sara Coppola, Pozzuoli (IT); Veronica Vespini, Pozzuoli (IT); Simonetta Grilli, Pozzuoli (IT); Melania Paturzo, Pozzuoli (IT)

(73) Assignee: CONSIGLIO NAZIONALE DELLE RICERCHE (IT)

( * ) Notice: Subject to any disclaimer, the term of this patent is extended or adjusted under 35 U.S.C. 154(b) by 767 days.

(21) Appl. No.: 13/265,720

(22) PCT Filed: Apr. 21, 2010

(86) PCT No.: PCT/IT2010/000172
§ 371 (c)(1),
(2), (4) Date: Jan. 5, 2012

(87) PCT Pub. No.: WO2010/122592
PCT Pub. Date: Oct. 28, 2010

(65) Prior Publication Data

US 2012/0112070 A1 May 10, 2012

(30) Foreign Application Priority Data

Apr. 22, 2009 (IT) ................................ RM09A0187

(51) Int. Cl.
*G01N 1/00* (2006.01)
*B01L 3/02* (2006.01)
*B41J 2/005* (2006.01)

(52) U.S. Cl.
CPC ............ *B01L 3/0262* (2013.01); *B01L 3/0268* (2013.01); *B41J 2/005* (2013.01);

(Continued)

(58) Field of Classification Search
CPC ................ B01L 3/0262; B01L 3/0268; B01L 2300/0819; B01L 2400/0415; G01N 2030/125; C40B 60/14
USPC ............ 422/501–504, 509, 515, 518; 436/43, 436/180
See application file for complete search history.

(56) References Cited

U.S. PATENT DOCUMENTS 4,053,806 A * 10/1977 Turnbull et al. .............. 313/388
5,108,576 A * 4/1992 Malmros et al. ........... 205/777.5

(Continued)

FOREIGN PATENT DOCUMENTS

EP 1477230 11/2004
EP 1550556 7/2005

OTHER PUBLICATIONS

Maeda et al., "Evaporation and instabilities of microscopic capillary bridges," PNAS (2003) 100(3):803-808.

(Continued)

*Primary Examiner* — Brian R Gordon
(74) *Attorney, Agent, or Firm* — Hershkovitz & Associates, PLLC; Abe Hershkovitz

(57) ABSTRACT

Production and the distribution of pico and nano-drops, which are extracted by the effect of a strong electric field generated by pyroelectric effect, in particular, but not exclusively, from a sessile drop (a drop placed on a surface assumes a form termed "sessile") or by a liquid film, and distributed on a dielectric substrate. The electric field is advantageously generated applying a heat source on the dielectric substrate or utilizing a laser source emitting in the infrared region. In this new approach, it is not necessary to use fixed electrodes, circuits, high tension generators or to design intentionally, and therefore to realize, pico- and nano-nozzles.

18 Claims, 6 Drawing Sheets

200μm
200μm
D=150μm
(a)
120
170
LiNbO₃
110
190
180
160
170'
LiNbO₃
170'
D
180
180
(b)

(52) U.S. Cl.
CPC ................. *B01J 2219/00378* (2013.01); *B01L 2300/0819* (2013.01); *B01L 2400/0415* (2013.01); *B01L 2400/0448* (2013.01)

(56) References Cited

U.S. PATENT DOCUMENTS

| | | | | |
|---|---|---|---|---|
| 5,477,249 | A | 12/1995 | Hotomi | |
| 6,062,668 | A * | 5/2000 | Cruz-Uribe | 347/19 |
| 7,438,859 | B2 * | 10/2008 | Massaro | 422/504 |
| 7,670,560 | B2 * | 3/2010 | Neitzel | 422/504 |
| 2005/0196322 | A1 * | 9/2005 | Truex et al. | 422/82.01 |
| 2011/0086365 | A1 * | 4/2011 | Carter et al. | 435/7.9 |
| 2011/0242162 | A1 * | 10/2011 | Tamura | 347/9 |
| 2012/0028342 | A1 * | 2/2012 | Ismagilov et al. | 435/283.1 |
| 2012/0220023 | A1 * | 8/2012 | Monaghan et al. | 435/287.2 |
| 2012/0231488 | A1 * | 9/2012 | Marshall et al. | 435/29 |
| 2014/0119995 | A1 * | 5/2014 | Ross et al. | 422/69 |

OTHER PUBLICATIONS

Ferraro et al., "Wettability patterning of lithium niobate substrate by modulating pyroelectric effect to form microarray of sessile droplets," Applied Physics Letters (2008) 92:213107-1-213107-3.

* cited by examiner

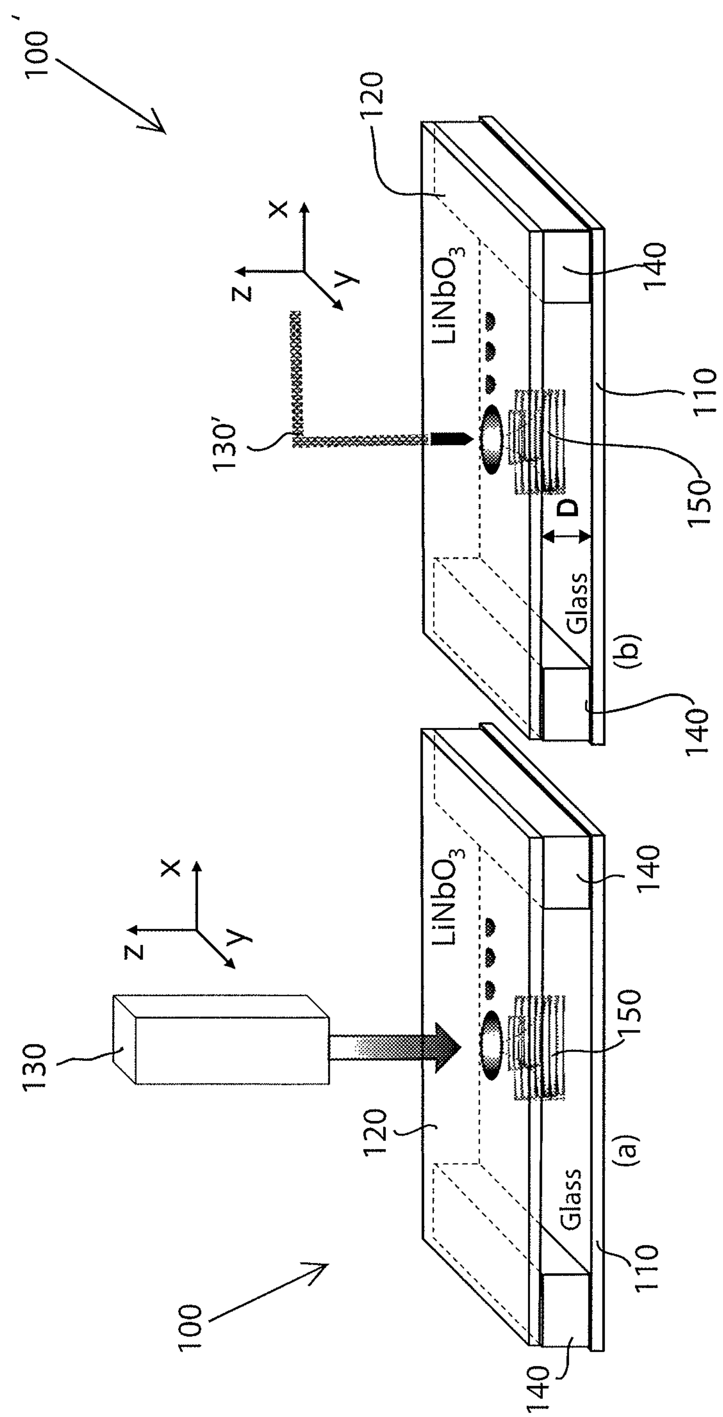
Fig.1(a)-(b)

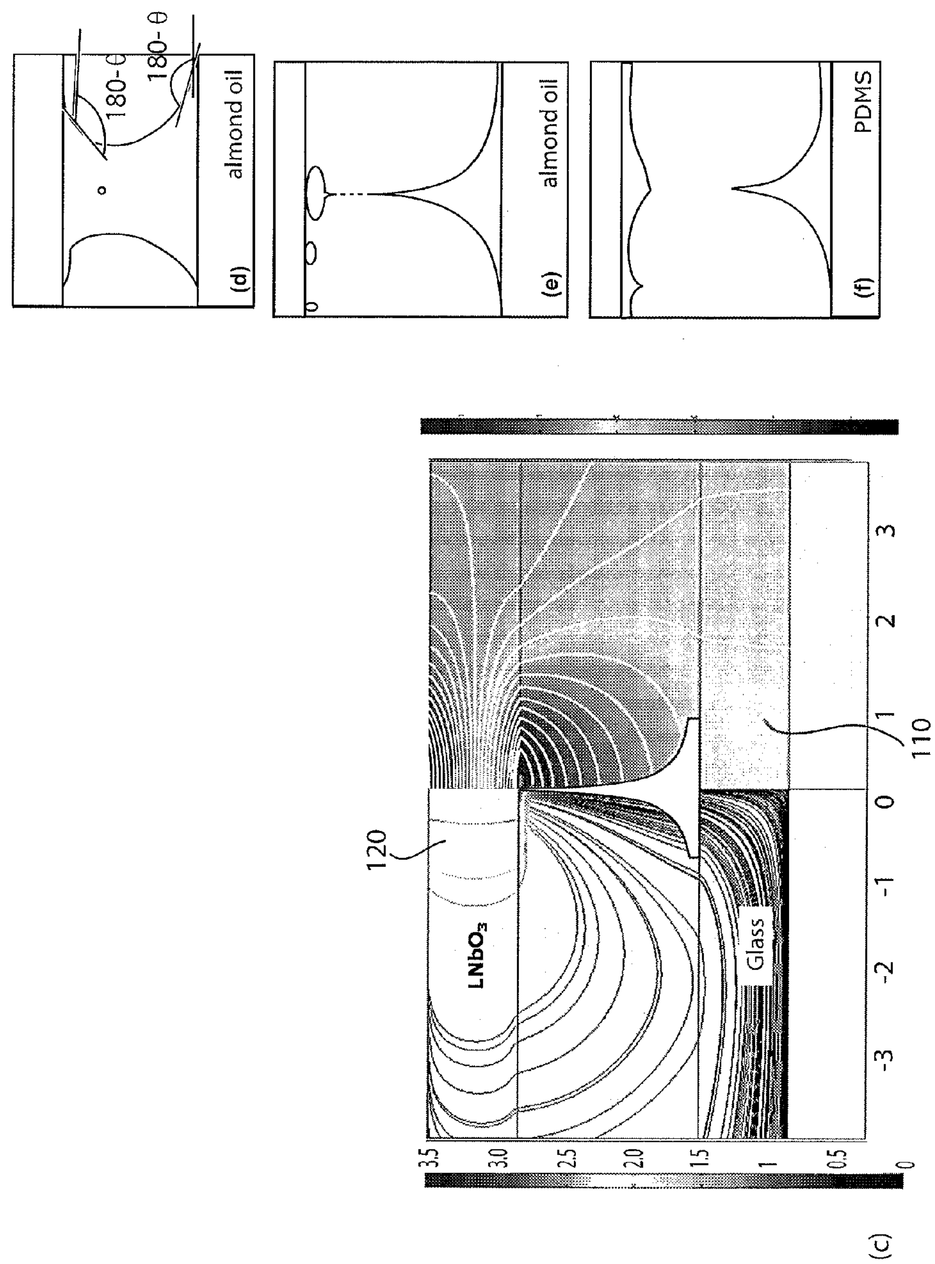
Fig.1(c)-(f)

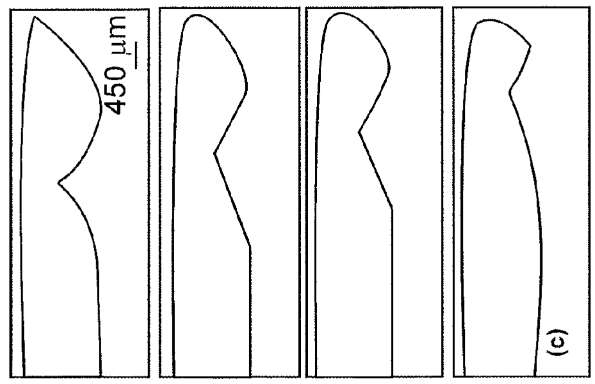
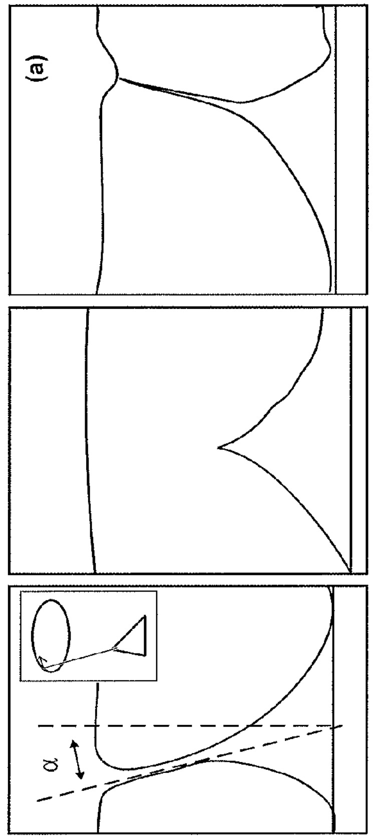
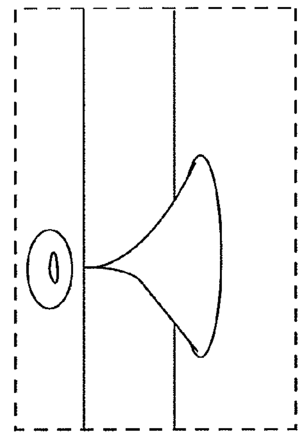
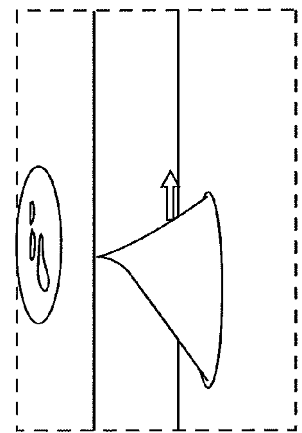
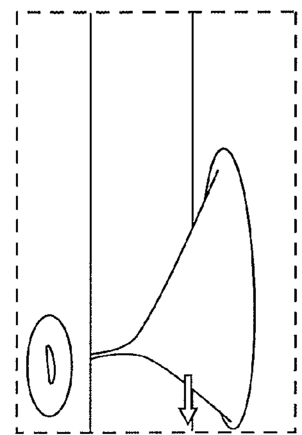
*Fig.3*

200µm
200µm
D=150µm
(a)
120
110
190
LiNbO3
180
170
160
170'
D
180
(b)

DEVICE FOR CONTROLLED DISTRIBUTION OF MICRO- OR NANO-VOLUMES OF A LIQUID BASED ON THE PIEZOELECTRIC EFFECT IN FUNCTIONALIZED MATERIALS, WITHOUT USING EXTERNAL ELECTRIC SOURCES

This application is a 35 U.S.C. §371 national phase application of PCT/IT2010/000172, which was filed Apr. 21, 2010 and is incorporated herein by reference as if fully set forth.

CROSS REFERENCE TO RELATED APPLICATIONS

The present application claims priority to Italian patent application RM2009A000187 filed on 22 Apr. 2009, which is incorporated herein by reference in its entirety.

FIELD OF INVENTION

The present invention concerns an electro-dynamical dispenser of liquids in micro-/nano volumes based on the pyroelectric effect in functionalized materials without using an external electrical field.

More in details, the present invention concerns the production and the distribution of pico and nano-drops which are extracted, by the effect of a strong electric field generated by pyroelectric effect, in particular, but not exclusively, by a sessile drop (a drop placed on a surface assumes a form named "sessile") or by a liquid film, and distributed on a dielectric substrate. The electric field is advantageously generated by applying a heat source on the substrate of interest or utilizing a laser source emitting at infrared region. In this new approach, then, it is not necessary the use of fixed electrodes, circuits, high tension generators or to design intentionally, and therefore to realize, pico- and nano-nozzles.

BACKGROUND

A variety of functions, useful in micro-fluid and opto-fluid systems, such as the adaptation of the liquid meniscus form, the spatial geometric modulation or "patterning", the shifting and drop formation [1-5-19], may be performed by different approaches, for example the "electro-wetting" (EW) or the thermo-capillary [2-20-21].

The traditional microfluidic systems are essentially based on hydrodynamic forces whereas the approaches assisted by electric field became more and more popular only recently, due to their advanced flexibility and their additional functionality [22-23]. The formation of micro- or nano-liter drops caused by electric field is useful in electro-spray mass spectroscopy, injkjet printing, biomolecular manipulation [16] that furnishes a so-called "on demand" distribution of material [7-15].

The solutions obtained with the standard electro-dynamic approach (EHD) are orders of magnitude better than those obtained with the thermal inkjet or piezo-electric [24] printers, and thus meet the growing request in the field of nanotechnology of more sophisticated lithographic methods that are able to realize more fine and complex patternings. These EHD printing methods may also furnish the desired flexibility in the direct patterning of fragile biologic organic materials that are incompatible with the method of conventional patterning, such as the photo-lithography.

Nevertheless, in all of the mentioned methods, special nano-nozzles, electrodes, and circuits have to be designed and realized for each application. In addition, the EHD method requires the application of high voltages (e.g. in the "e-jet printing"), usually between the nozzle and the distribution plate, so as to allow the flow of fluid and its distribution on the substrate under examination.

Therefore, photo-lithographic methods are not easily used for such materials and, in the current situation, methods are not available that are characterized by high flexibility, simplicity and low cost, so as to permit easy change in the type of structure to be realized.

Recently, a new concept known as electrowetting has been developed, in which the manipulation of the liquid is achieved by a configuration in polar dielectric crystals, without electrodes. The functionalisation (i.e., in general, the adaptation of the crystal to activate a property) of a lithium niobate (LN) crystal is obtained by the micro-engineering of the ferroelectric domains [25] and the exploitation of the piro-electric effect. The modelling of the wettability, the formation of the liquid adaptable micro-lens matrix, and the auto-assembly of lithography have been demonstrated by this approach [26-27-28].

The first of the three previous mentioned works demonstrates the creation of a group of little drops spatially arranged on a surface starting from a liquid film. These drops function as a lens.

The second work demonstrates the use of such drops for non-optical purposes, for example for chemical and biological experimentation at nano-metric levels.

The third work demonstrates the mentioned creation of drops starting, this time, from a liquid polymer by means of a thermal stimulus. This thermal stimulus simultaneously provides for the "linking" of the same polymer, impressing a regular geometric configuration ("pattern") to the polymer, and thus a lithographic method is obtained, in such a way.

It is the object of the present invention is to provide a method for the distribution of pico- or nanodrops of a material on a dielectric substrate, that solves the problems and overcomes the drawbacks of the prior art.

An additional specific object of the present invention is an apparatus that uses the method object of the invention.

An additional specific object of the present invention is the use of the apparatus, object of the invention, for printing.

SUMMARY

The subject-matter of the present invention is a method for the controlled distribution of pico- or nano-volumes of a liquid, comprising the step of:

A. Deposing the liquid as a film or separated sessile drops on a surface of a starting substrate;
   the liquid being extracted and distributed on the surface of a substrate called "destination substrate", the method being characterized in that:
   at least one between said starting substrate and destination substrate is a pyroelectric substrate;

The method comprising the following further step:

B. Varying the temperature of said pyroelectric substrate to induce a surface charge density σ such that the liquid, undergoing the electro-dynamic force, creates dispensing cones wherefrom droplets detach, which are deposed on the surface of the destination substrate, The surface of the destination substrate being set at a distance D, from the surface of the starting substrate facing it, larger than the critical distance given by the following:

$$Dc=(1+\theta/4)V^{1/3}$$

wherein θ is the contact angle of the dispensing cone and V the volume of the liquid of the same dispensing cone.

Preferably according to the invention, the superficial charge density (σ) is given by:

$$\sigma = Pc\Delta T,$$

neglecting the losses, wherein Pc is the pyroelectric coefficient specific to the material and ΔT is the temperature variation of said pyroelectric substrate.

Preferably according to the invention, the pyroelectric surface has been obtained modifying its wettability.

Preferably according to the invention, the mentioned pyroelectric substrate is Lithium Niobate z-cut or Lithium Tantalate.

Preferably according to the invention, the heating is performed selectively on the surface of the pyroelectric substrate.

Preferably according to the invention, the heating is effected by infrared Laser or any source of electromagnetic radiation.

Preferably according to the invention, the heating is effected by means of a movable heated tip.

Preferably according to the invention, the pyroelectric substrate has been functionalized by creating periodic polarized structures, in correspondence of which one has deposed sessile drops, to obtain a surface charge distribution with charge having alternated sign and pre-defined geometry.

Preferably according to the invention, the movable heat source is moved in such a way that, when the off-the-axis distribution angles of the liquid are larger than a threshold value α that is function of the liquid type, of the material on which the sessile drop is put down and of the type of electric charge distribution on the pyroelectric substrate, the sessile drop moves, whilst when the off-the-axis distribution angle is smaller than said threshold value, the sessile drop keep fixed and the liquid can be distributed within this cone having apex angle α.

Preferably according to the invention, the laser beam is separated in such a way that a plurality of spatially separated beams incise simultaneously on the pyroelectric substrate, thus creating a simultaneous emission of liquid from multiple sessile drops or different points of the liquid film.

Preferably according to the invention, the wettability is with poling processes and thermal stimuli.

Preferably according to the invention, the pyroelectric substrate is the destination substrate.

Preferably according to the invention, the liquid to be distributed is any liquid which reacts to an applied electrical field, in particular chosen in the group consisting of: almond oil, poly-dimethyl-siloxane (PDMS).

Preferably according to the invention, a PDMS liquid layer is put down on the starting substrate, creating, on the destination substrate, through its selective heating hanging drops in correspondence of the surface hexagons of the same pyroelectric substrate.

Preferably according to the invention, the starting substrate is glass.

Preferably according to the invention, the starting substrate is the pyroelectric substrate.

Preferably according to the invention, the starting and destination substrates are pyroelectric, being both heated, therefore, they receive the liquid from the surface of the opposite substrate.

Further specific subject-matter of the present invention is a method for the controlled distribution of pico- or nano-volumes of a liquid, comprising the step of:

C. Deposing the liquid as a film or separated sessile drops on a surface of a starting substrate;

the liquid being extracted and distributed on the surface of a substrate called "destination substrate", the method being characterized in that:

at least one between said starting substrate and destination substrate is a piezoelectric substrate;

The method comprising the following further step:

D. Inducing a mechanical stress in said piezoelectric substrate to induce a surface charge density σ such as the liquid, undergoing the electro-dynamic force, creates dispensing cones wherefrom droplets detach, which are deposed on the surface of the destination substrate, The surface of the destination substrate being set at a distance D, from the surface of the starting substrate facing it, larger than the critical distance given by the following:

$$Dc = (1+\theta/4)V^{1/3}$$

wherein θ is the contact angle of the dispensing cone and V the volume of the liquid of the same dispensing cone.

It further is specific subject-matter of the present invention is a device controlled distribution of pico- or nano-volumes of a liquid, comprising:

a first substrate called "starting substrate" whereon the liquid to be distributed is deposed;

a second substrate called "destination substrate" whereon the liquid is to be distributed;

the device being characterized in that:

at least one between said starting substrate and destination substrate is a pyroelectric substrate;

at least a heat source is comprised for heating said at least a pyroelectric surface;

means are comprised suitable for setting the surface of destination substrate at a distance D, from the surface of the starting substrate facing it, larger than the critical distance given by the following:

$$Dc = (1+\theta/4)V^{1/3}$$

wherein θ is the contact angle of the dispensing cone and V the volume of the liquid of the same dispensing cone.

Additional specific object of the present invention is a device for the controlled distribution of pico- or nano-volumes of a liquid, comprising:

a first substrate called "starting substrate" whereon the liquid to be distributed is deposed as a film or sessile drops;

a second substrate called "destination substrate" whereon the liquid is to be distributed;

the device being characterized in that:

at least one between mentioned starting substrate and destination substrate is a piezoelectric substrate;

at least a source of mechanical stress is comprised for inducing a mechanical stress in said at least a piezoelectric substrate;

means are comprised suitable for setting the surface of destination substrate at a distance D, from the surface of the starting substrate facing it, larger than the critical distance given by the following:

$$Dc = (1+\theta/4)V^{1/3}$$

wherein θ is the contact angle of the dispensing cone and V the volume of the liquid of the same dispensing cone.

Preferably according to the invention, the device comprises a third substrate, that is dielectric, the second substrate being interposed in a movable way parallel to said third substrate, so as to intercept the liquid being distributed, in such a case the surface of the destination substrate is set at a distance D calculated between the surface of the starting substrate and the surface of the interposed substrate.

Preferably according to the invention, the starting substrate includes through micro-holes and micro-tubes for dosing the distribution liquid in the sessile drops.

Preferably according to the invention, the liquid is sucked by suction channels if an immediate interruption of the distribution is wished.

Preferably according to the invention, the destination substrate surface is set at a distance D from the starting substrate surface by means of electrically insulating spacers.

It is further specific subject-matter of the present invention the use of the device subject-matter of the present invention.

BRIEF DESCRIPTION OF THE DRAWINGS

The invention will be described in the following by way of illustration but not by way of limitation, with particular reference to the drawings of the attached figures, wherein:

FIG. 1 shows in (a) and (b) a diagram of the apparatus according to the invention, in two different embodiments of invention; in (c) a bi-dimensional plot of the electric field lines (left) and of electric potential (right) obtained with by a finite-elements simulation method of finished elements; in (d) a typical liquid bridge and in (e)-(f) typical discharges of the liquid, respectively, with almond oil and PDMS;

FIG. 3 shows the functionality of the "dispenser gun": discharge at angled direction, distribution of liquid and lateral simultaneous shifting, liquid linear patterning in different positions, and specifically in:

Figure 4:
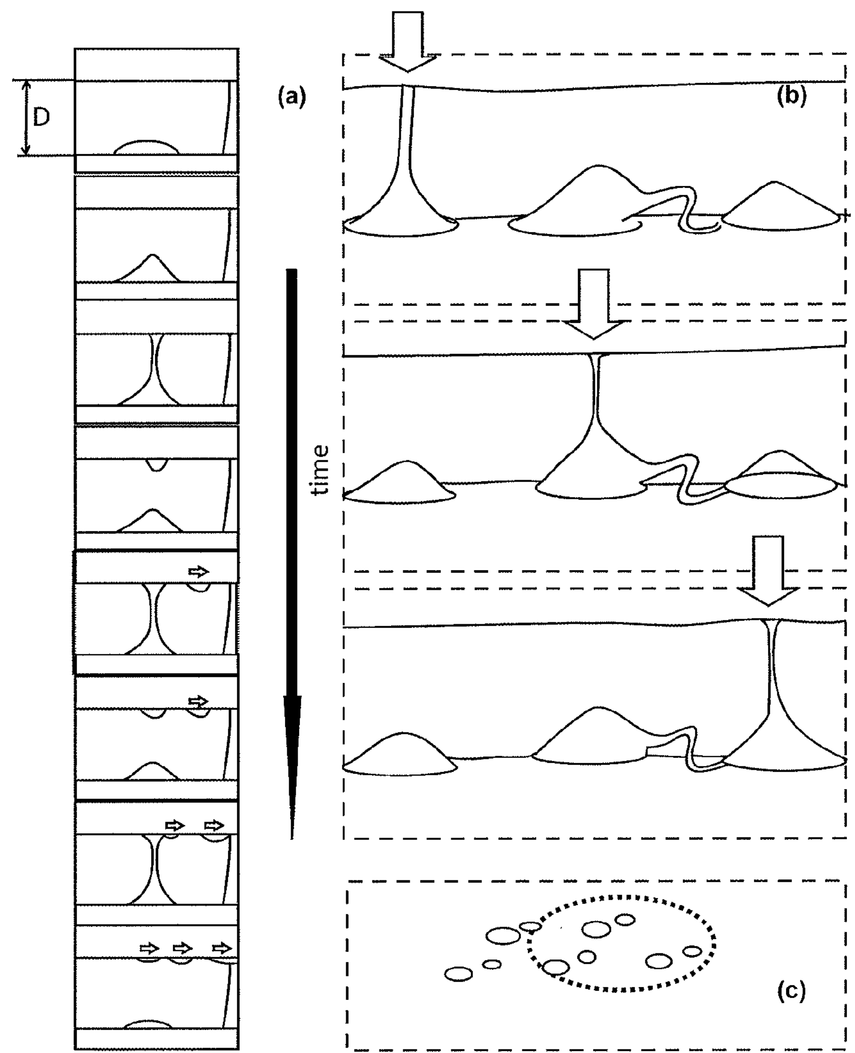
Figure 5:
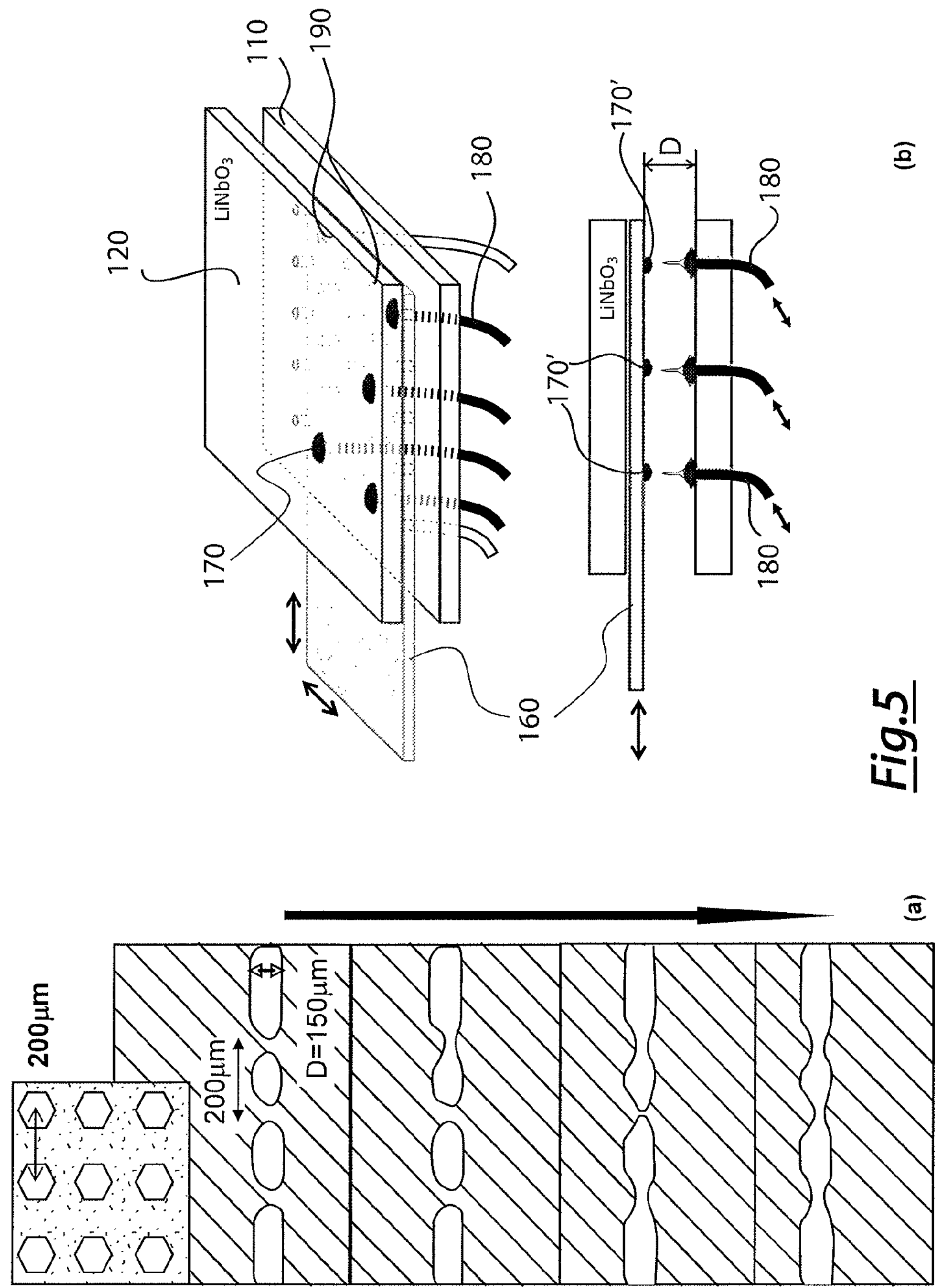

(a) microliter liquid drops distribution along angled directions (about) 20° from a reservoir constituted by a sessile drop;

(b) set of sessile drops, each one constituted by a reservoir, on PDMS covered glass: by activating and laterally shifting the dispenser gun, it is possible to deposit the liquid in different points, thus tracing continuous or discontinue lines with arbitrary overall geometries; the traced lines on the left, in the middle and on the right are showed in the corresponding frames;

(c) in case of liquid film, dispenser gun movement in the x and y directions;

FIG. 4 shows more implemented functionalities: multiple distribution and transport and "dispenser gun" activation for the distribution of high capacity by means of laser scanning on the LN surface, in particular:

(a) picture sequence concerning an harmonic process of nano-liter drops distribution and consequent subsequent transportation;

(b) liquid distribution by stimulating with the infrared laser the substrate in three different positions in which a sessile drop is placed on the glass substrate;

(c) disposition of five reservoir sessile drops of almond oil on glass covered with PDMS; the circle indicates sessile drops activated in FIG. 4(*b*);

FIG. 5 shows the pico-liter distribution on micro-engineered LN substrate, and in particular:

(a) LN sample is micro-engineered with periodically polarised and hexagonal dominia; the PDMS liquid has been spread out on glass;

(b) disposition for the integrated distribution, exploitable for the patterning on a dielectric substrate inserted between the superior LN substrate and the glass instead of dispensing directly on the LN substrate.

DETAILED DESCRIPTION OF THE PREFERRED EMBODIMENTS

The apparatus according to the invention is shown in FIGS. 1(*a*) and 1(*b*). In both the shown embodiments 100,100', a liquid drop 150 or a liquid film is deposed on a slide 110, while an upper plate 120 is at a distance D from the slide by electrically isolated spacers 140. The upper plate 120 is a z-cut LN wafer (Lithium Niobate) (see section of methods for details concerning the preparation), for example of 500 μm of thickness.

The spacers can be more or less thermally conductors, allowing a greater or lesser activation of the drops (see later on).

In a first preferred embodiment (FIG. 1(*a*)), some thermal stimuli are applied in a contactless modus by an infrared source (laser CO2) 130 that emits at a wavelength of $\lambda=10.6$ μm.

In a second form of favourite realization, the heated tip source 130' is in contact with a LN crystal 120 (FIG. 1(*b*)). The laser and the tip can be moved so as to induce local punctiform point-like thermal stimuli. The distance between the slide 110 and the plate 120 is, for example, of 1 mm.

In both the illustrative cases, the z-cut LN crystal reacts to the thermal stimuli by forming an electric potential through its two surfaces (z+, z−) due to the piezoelectric effect.

The pyroelectric effect consists in the change of spontaneous polarisation $\Delta P_s$ consequent to a temperature variation $\Delta T$ [29]. At the equilibrium, the crystal Ps is completely screened by the charge of external shield and no electric field exists. When the point-like source or the laser beam heats locally the crystal, suddenly a superficial charge density $\sigma$ appears given by:

$$\sigma=Pc\Delta T$$

neglecting the losses, where Pc is the specific pyroelectric coefficient of the material ($Pc=-8.3\times10^{-5}$ C/° C./$m^2$ per LN a 25° C.).

The electric field has an attractive force on a liquid as shown in FIG. 1(*c*). The electric potential is due to the electric effect induced on the streamlined substrate by the thermal stimuli operated by the heated tip. In the case of a sufficiently strong electric field, thin jets of liquid can be released by a conical tip structure (similar to the Taylor cone usually utilized in the electro-spray; nevertheless, in the present case, the liquid is not conductive, consequently there is not exactly the Taylor cone regime) [15-16-17].

When the liquid (either sessile drops or a film) starts to get deformed under the action of the electric field, two evolutions are possible.

In the first case (I): if the liquid volume and the separation distance D between the two plates are appropriate, then a stable liquid bridge can be formed (see FIG. 1(*c*)). For a specific volume, the critical distance under which a liquid bridge can be formed is expressed by [30]:

$$Dc=(1+\theta/4)V^{1/3}$$

wherein $\theta$ is the contact angle and V the volume of the liquid bridge. For contact angle, here, the starting angle of the cone formed by the liquid is intended, angle that may be different at the ends of the bridge, as shown in the following. This angle is univocally defined both by the liquid cone generated by a drop and by the liquid cone generated by a liquid film, the starting angle being always measured with respect to the substrate or the surface of the remaining liquid parallel to the substrate (see i.e. FIGS. 1 (*e*) and 2 (*b*)).

A typical liquid bridge is shown in FIG. 1(*d*). The different contact angles at the upper and lower solid-liquid interfaces are to be noted, what is indicative that the liquid bridge is formed between the two materials with different wettability properties.

Nevertheless, for the present invention the second case (II) is more important: if the separation D is over the critical value, a stable liquid bridge cannot be stabilised between the plates. The present invention has been reached by searching a way for using this instability with the aim of dosing and distributing the liquid drops. In FIGS. 1(*e*) and 1(*f*) the typical situations of liquid discharge for two different liquids are shown, almond oil and PDMS (poly-dimethyl-siloxane) respectively. Due to the high viscosity, the emission liquid cone is continuous.

Figure 2:
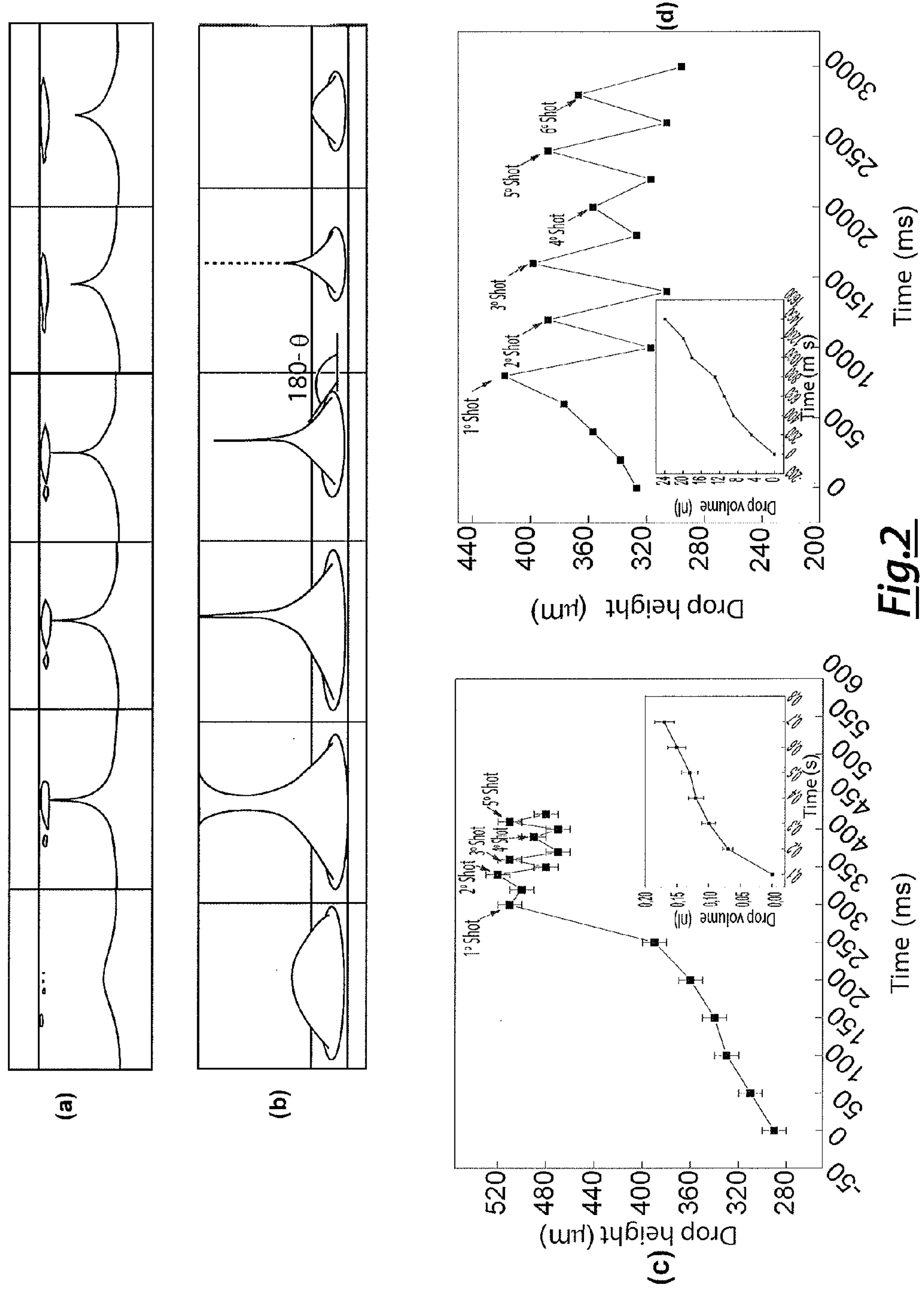
FIG. 2 shows: in (a) a sequence of different discharges of distribution in case of liquid film and thermal stimulus inducted through by the heated tip; in (b) a sequence of different discharges of distribution in case of sessile drops and thermal stimulus inducted through by infrared laser; in (c) a plot of the volume transfer percentage concerning the FIG. 2(*a*) (square box) and a plot of the height variation during the time (principal plot); in (d) a plot of the volume transfer percentage concerning the FIG. 2(*b*) (square) and a plot of the height variation during the time (principal plot)

The results shown in FIGS. 2(*a*) and 2(*b*) demonstrate the distribution of almond oil nano-liter drops from a liquid film and from a sessile drops reservoir, respectively (see methods section). In the performed experimentation with the liquid film (see FIG. 2(*a*)), a heated tip has been utilized, whereas, for the sessile drop, the heating has been stimulated by the laser in the infrared zone. The dynamic evolution shows the liquid deformation in both the situations and it is possible to observe from the sequences (not shown) how the film and the drop heights grow under the EHD force action. These phenomena have been shot with a CMOS camera with a rate of recording photogram of 125 photogram/s.

In FIGS. 2(*c*) and 2(*d*), traces of liquid volumes transferred from the substrate as a function of time (square) and the height change (principal plot) during the discharge are shown. In the case of FIG. 2(*a*), the rate is approximately equal to 30 nL/ms. After five discharges, the total volume transferred to the pending drop (the one formed by the destination substrate) is 160 nL. The drop acts as a dispenser gun with a rate of repetition that depends on the liquid response to the EHD force. It can be observed that, after the formation of the Taylor cone, in order to permit the first discharge, the dispenser gun shoots periodically liquid drops if the electric field is still active. The period of discharge has been of 50 ms. The cycle is repeated few times during the cooling.

As shown in FIG. 2(*b*), which has been obtained utilising a $CO_2$ laser (but a similar result can be obtained other laser or other electromagnetic radiation sources) it is possible to proceed to the complete extraction of the liquid from the drop reservoir. This fact could be due to the improved mechanism of heating efficiency. After the irradiation of five impulses of 10 W, each one of 100 ms duration, it has been observed that the drops reservoir dispense until 55 discharges. The initial volume was of 180 nL while the total final volume transferred to the photogram in FIG. 2(*b*) was 164 nL and the remaining drop was 16 nL. The discharge period has been of 200 ms while the volume transferred in each discharge has been estimated to be 3 nL.

A physical global image of the mechanism of cone formation, jet emission and interruption, that happen during the continuous emission from the EHD tip from a liquid film of finite conductivity, has been provided only recently by the Basaran group [17] (obtained through the use of high electrodes and tensions as previously described), even if the process is well known and utilized since decennia. The simulations and the experiments there described are referring to an axial symmetric case. Obviously, in the case of the present invention, the situation is more complicated since experimentations with more complicated configurations are described. Nevertheless, from the conducted trials, the Inventors have understood that by modifying some parameters such as the distance, the fluid, the volume and the heating, it will be possible to regulate the system performances.

The flexibility of the approach according to the invention is demonstrated by the following experiments in which different functionalities have been tested.

The movement of the heated tip or of the laser permits, for example, to change the emission direction of a drop in a large solid angle as shown in FIG. 3(*a*). In fact, by changing the heated tip position, it is possible to rapidly change (about 2 s) the electric field distribution. The region with the highest electric field follows the tip movement. Angles of discharge out of axis reach in this case values until about 20°. This may give the possibility to dispense liquids in an area of 23 $mm^2$ even if the reservoir drop maintains a fixed position. More large angles imply movement of the reservoir drop, as described in the following.

In an additional different embodiment, the "dispenser gun" is moved at the same time as it is discharged in a continuous manner allowing the liquid patterning. In this case it is important to select conditions in which dragging the drop in different positions is possible, as described in the following.

In both cases the "dispenser gun" can be easily moved, by simply moving the heated tip. Nevertheless, in the first case the sessile drop starts to move only at a critical angle. Indeed, the asymmetric deformation experimented by the drop, under the non-axial electric force, generates an unbalance of the solid-liquid interfaces tensions with a net resulting force (see FIG. 3(*b*)) that pushes forward the drop. This unbalance causes the drop displacement similarly to the thermocapillarity where the thermal gradient causes the loss of balance of the solid-liquid tensions. In FIG. 3(*b*), how the drop movement permits the pattering is shown, by the drops distribution from the reservoir drop in three different position along a single scanning line.

In case of liquid film, the "dispenser gun" can be simply removed since no solid-liquid interfaces tension is in opposition with the emission cone movement. A sequence of images (FIG. 3(*c*)) shows the lateral movements (x-axis) until 1.6 mm without distribution axis interruption, and 1 mm along the y axis (the shifting along the y axis is observable since the liquid cone is better brought in focus in the final frame (base) with respect to the out-of-focus third position that is observed in the first (upper) frame).

A more enchanting function of the present invention is the harmonic combination of the distribution function synchronised with the drops transport, at the same time as they are continuously formed, function that is shown in the sequence of FIG. 4(*a*). The sequence of images in FIG. 4(*a*) clearly shows the formation and the synchronised transport, on the destination substrate, of three different drops in straight line on the right side. These drops can be easily collected and managed in a microfluidic system. This function may be successfully improved by selecting in an appropriate manner the position of the thermal stimuli (heated tip, in this case). The beauty of the physical phenomenon is that the process seems to be auto-organised as a function of two different physical effects: EHD and thermocapillarity, but activated by an only single external stimulus. The lateral shift is activated by thermocapillarity, that pushes the drops towards colder regions (in our case left and right sides) (see FIG. 4(*a*)).

The reason why in the shown experiment the x direction is preferred depends on the geometric design of the cell. The upper substrate LN is in contact with the glass at the +x and −x ends (therefore the heating exchange with the glass is larger than in air). The contact with the glass permits a heat exchange that is higher along this direction than in the y direction. Nevertheless, in principle +x and −x sides are equivalent but if the heated tip source is not symmetrically positioned, in axis, with respect to the bottom of the reservoir drop, the liquid discharges have a moment with horizontal components that dynamically pushes the liquid preferably along the axis of the device (right side). The angle, in this case, is clearly visible from the image and it is of about 11° with respect to the normal at the substrate.

It is important to note that by using a laser it is easy to direct the thermal stimulus in different points, in other words in correspondence of different sessile reservoir drops. In addition, with the laser it is possible to better proportion the heating energy by modulating the beam power. Besides, through a simply lenticular focalisation, it is possible to narrow better the area on which the thermal stimulus is applied. As shown in FIG. 4(*b*), the laser beam has been directed at three different reservoir drops (see FIG. 4(*c*)) stored on a glassy substrate. The drops have been sequentially activated. An elevated distribution of volume is possible by separating the laser beam so as to obtain a parallel emission from many "dispenser guns" (thus accelerating the distribution process).

Finally, in order to demonstrate the picoliter drops distribution in specific points, an additional experiment has been carried out wherein a sample of functionalized LN has been utilized in which periodically polarised structures have been micro-engineered. The structure has got hexagons displaced in a square matrix (see method section).

This regular structure permits to form some cones starting from the liquid that will spread itself exactly over and in correspondence of the hexagons.

A liquid PDMS layer has been spread over the glassy substrate. By using thermal stimuli (in a flexible manner through the use of a laser or large heating) the formation of three tank drops has been demonstrated in correspondence of the hexagons having a lateral separation of 200 micrometers. Since PDMS is more viscous, liquid filament and unstable liquid bridges have been formed [30], as clearly visible in FIG. 5(*a*). In fact, the separation distance D=I50 micrometer was again over the critical distance given by equation I. After the bridges collapsed, 400 pL of pending drops have been clearly distributed in the exact position corresponding to the geometry of the PPLN sample (see FIG. 5(*a*)).

The system according to the invention can be utilized in different configuration so as to permit the drops distribution and their patterning. In the basic configurations a single or multiple "dispenser gun" can be obtained from one or more thank drops, preliminary obtained by processes of wettability modelling (spatial modulation of poling or thermal stimulus) on the lower substrate.

Nevertheless, additional configurations can be provided, in which the substrate to be modelled is not the same dielectric polar functionalized crystal. In fact, the substrate on which the liquid is laid down could be a dielectric plate (so as to avoid field perturbations) or film 160 inserted between the glass 110 and LN 120, in order to intercept the liquid drops as shown in FIG. 5(*b*). In this case, a geometric design may be obtained as formed by the separated drops even with the substrate shift, as shown in figure. In principle, every geometrical figure can be realized.

Besides, a system limit is the immediate interruption of the liquid emission is not possible, since the electric field slowly extinguishes with the sample cooling. An additional configuration may be provided in order to overcome this disadvantage. The glassy plate 110 may house through micro-pores 190 and micro-tubes 180 to dose the distribution liquid in the reservoir drops. Besides, the liquid may be sucked from aspiration ducts if one wishes the immediate interruption of the distribution action. The actual level of technology will allow, by means of computer and control electronics, the total implementation of this integrated configuration of the method according to the invention for distributing and modelling a liquid material.

Again, another form of realisation provides spreading the liquid on LN and heating it thereon in order to realise the distribution on the plate.

Further, a different form of realisation provides that the two starting and destination surfaces are both pyroelectric surfaces, so as to create a reciprocal distribution of the liquid between the two surfaces. This may be useful in mixing processes.

Methods

Lithium Niobate Crystal

The z-cut LN crystals, commercially available, show uniform polarisation. The spontaneous polarisation of LN crystals can be reversed by a polarisation process with electric field (EFP) [25], thus allowing the fabrication of periodically polarised LN crystals (PPLN). An external tension that goes over the coercive field of the material (about 21 kW/1 mm) has been necessary to invert the ferroelectric domains and the inversion selectivity is usually assured by an appropriate model of resist generated by photo-lithography. In the upper image of FIG. 5(*a*), the image obtained at the optical microscope of two PPLN samples produced by the same Inventors by "Electric Field Poling" (EFP) is shown. The samples consist in a square matrix of bulk reversed domains with a period of about 200 micrometers along both the x and y directions. The pyroelectric coefficient sign is reversed according to the inverted ferroelectric domains [29].

Infrared Laser

In the experiments previously described, a $CO_2$ CW laser having an emission power of 10 W at a wave length of $\lambda$=10.6 micrometer has been utilized. The power modulation in the range of 0-100% has been possible thanks to an external tension of 0-5 V. The laser beam diameter has been of 4 mm. The beam can be focused through suitable lens so as to obtain the desired beam dimension in the diffraction range of about half wave length (5 micrometer). The laser has been assembled on a x-y translational stage. The sphere head was about 25 cm apart from the LN sample.

Heated Tip Source

A simple tip has been utilized for heated welding/soldering. The diameter was of 1 mm. The maximum operative temperature was 250° C. The temperature has been measured by a temperature probe (thermocouple) in order to have a preliminary indication of the maximum temperature reached on both LN crystal faces.

Liquid Film and Thank Drops Preparation

As lower glassy plate, a microscopy plate of 1 mm thickness has been used. Different modalities have been utilized for preparing liquid film and reservoir drops, as described in the following:

1) almond oil as liquid film on glass: some microliter drops have been spread on glassy substrate (experiments as shown in FIGS. 1(*e*),2(*a*),3(*c*));

2) or alternatively almond oil as sessile drop on a clean plate: in order to have a sessile drop with contact angle of about 40° (experiments as shown in FIG. 4(*a*));

3) almond oil as sessile drop on a PDMS covered plate: in order to have a sessile drop with relatively high contact angle, a glassy substrate has been covered with a PDMS (Sylgard) layer spread with a covering at 5000 rpm for 60 s; the PDMS link process has been obtained through a heated plate at constant temperature of 100° C. for 10 min. Afterwards, one or more drops of different volume (depending on the specific experiments) have been spread on a surface. The typical contact angle has been measured to be 30° (experiments as shown in FIGS. 2(*b*),3(*a*),3(*b*),4(*b*));

4) PDMS on glass: few microliter drops of PDMS polymer have been deposited and spun on glass at 1000 rpm for 5 s; this preparation has been adopted in the experiments illustrated respectively in FIGS. 5(*a*) and 1(*f*).

Image Recording Apparatus

The measurement equipment is composed by a white lamp, a neutral density filter and a lens of images formation for visualising in a high rate CMOS camera the process of Taylor cone deformation and the drops ejection. The CMOS camera, capturing 125 frame each second at the 1280×1024 resolution with pixel area of 12×12 micrometer, is utilized with two different lens for comprehending the fundamental dynamic of this process.

When the thermal stimulus is applied an infrared laser source, the lens focus of image formation is 100 mm and the magnification is M=1.4, while, by utilising a heated tip source, in contact with the LN crystal, f=25.4 mm and M=2.2.

The method according to the present invention is applied in many industrial, scientific and technological fields; the nanodrops production is, in fact, of principal interest, for example, in all the sectors that treat ink-jet printing, distribution or deposition of organic, inorganic or biological inks, microfluids, electrospray, drug delivery, and combinatory chemistry.

This method not only resolve some existing problems in continuously developing fields, such as the ink-jet printing one, but provides at the same time the possibility to explore completely different sectors such as the biological ones. The creation of protein microstructures is for example a field in which, still today, a lot of difficulties are present due to the use of highly sophisticated robotic equipments, these problems can be overcome by utilising the described method that introduces a new concept of deposition, eliminating completely the contact with the sample.

Among the advantages of the invention method, with respect to the other traditional deposition techniques, there is, indeed, the possibility to deposit solution or liquid suspension drops of micrometric dimension without contact with the substrate. In this manner, it is possible to obtain, with a micrometric resolution, surfaces having a defined geometry.

The particularity of the method, according to the invention, is the great flexibility that characterises the configuration lacking in electrodes in which the electric forces are generated by the heating induced by the utilized source directly on the interested substrate. The lack of fixed electrodes, high tension generators and complex circuits, allow to easily modify the applied forces on the basis of the different requirements.

BIBLIOGRAPHIC REFERENCES

1) Todd M. Squires and Stephen R. Quake Microfluidics: *Fluid physics at the nanoliter scale. Rev. Mod. Phys.* 77, 977-1026 (2005)

2) B. S. Gallardo, V. K. Gupta, F. D. Eagerton, L. I. Jong, V. S. Craig, R. R. Shah, N. L. Abbott, *Electrochemical principles for active control of liquids on submillimeter scales. Sci.* 283, 57-60 (1999).

3) D. E. Kataoka, S. M. Troian, *Patterning liquid flow on the microscopic scale. Nature* 402, 794-797 (1999).

4) D. Aronov, G. Rosenman, A. Karlov, A. Shashkin *Wettability patterning of hydroxyapatite nanobioceramics induced by surface potential modification. Appl. Phys. Lett.* 88, 163902-3 (2006).

5) G. M. Whitesides The origins and the future of microfluidics. *Nature* 442, 368-373 (2006)

6) Orlin D. Velev, Brian G. Prevo and Ketan H. Bhatt, *On-chip manipulation of free droplets*. Nature 426, 515-516 (2003)

7) J. Choi, Y.-J. Kim, S. Lee, S. Uk Son, H. S. Ko, V. D. Nguyen, and D. Byun, *Drop-on-demand printing of conductive ink by electrostatic field induced inkjet head*, Appl. Phys. Lett. 93, 193508 (2008)

8) H. Ren, R. B. Fair, and M. G. Pollack, *Automated on-chip droplet dispensing with volume control by electro-wetting actuation and capacitance metering. Sensors and Actuators*, B (Chemical), vol. B98, 319-27, (2004).

9) D. L. Wilson, R. Martin, S. Hong, M. Cronin-Golomb, C. A. Mirkin, and D. L. Kaplan, *Surface organization and nanopatterning of collagen by dip-pen nanolithography*, PNAS, 98, 13660-13664, (2001).

10) W.-K. Choi, E. Lebrasseur, M. Imran Al-Haq, H. Tsuchiya, T. Torii, H. Yamazaki, E. Shinohara and T. Higuchi, *Nano-liter size droplet dispenser using electrostatic manipulation technique, Sensors and Actuators*, A: Physical 136, 1, 484-490 (2007).

11) J.-G. Lee, H.-J. Cho, N. Huh, C. Ko, W.-C. Lee, Y.-H Jang, B. S. Lee, In S. Kang and J.-W. Choi *Electrohydrodynamic (EHD) dispensing of nanoliter DNA droplets for microarrays*. Biosensors and Bioelectronics, 21, 2240-2247, (2006).

12) Strobl C. J., von Guttenberg Z., Wixforth A., *Nano-and pico-dispensing of fluids on planar substrates using SAW, Ultrasonics, Ferroelectrics and Frequency Control*, IEEE Transactions on, 51, 1432-1436 (2004).

13) R Ahmed and T B Jones, *Optimized liquid DEP droplet dispensing*, J. Micromech. Microeng. 17 1052-1058 (2007)

14) B. de Heij, M. Daub, O. Gutmann, R. Niekrawietz, H. Sandmaier, R. Zengerle, *Highly parallel dispensing of chemical and biological reagents*. Anal Bioanal Chem 378, 119-122 (2004).

15) J. U. Park, M. Hardy, S. J. Kang, K. Barton, K. Adair, D. K. Mukhopadhyay, C. Y. Lee, M. S. Strano, A. G. Georgiadis, P. M. Ferreira, J. A. Rogers, *High-resolution electrohydrodynamic jet printing*, Nat. Mater. 6, 782-789 (2007).

16) Owen Y. Loha, 1, Andrea M. Ho a, 1, Jee E. Rima, Punit Kohlib, Neelesh A. Patankara, and Horacio D. Espinosaa, *Electric field-induced direct delivery of proteins by a nanofountain probe*, PNAS 105, 16438-16443 (2008)

17) Robert T. Collins, Jeremy J. Jones, Michael T. Harris & Osman A. Basaran, *Electrohydrodynamic tip streaming and emission of charged drops from liquid cones*. Nature Physics 4, 149-154 (2008)

18) A. Barrero and I. G. Loscertales, *Micro-and Nanoparticles via Capillary Flows*, Annu. Rev. Fluid Mech. 39, 89-106 (2007)

19) D. Psaltis, S. R. Quache, C. Yang, *Developing optofluidic technology through the fusion of microfluidics and optics*. Nature 442, 381-386 (2006).

20) F. Mugele, J.-C. Baret, *Electrowetting: from basics to applications*. J. Phys. Condens. Matter 17, R705-R774 (2005).

21) Z. Jiao, X. Huang, N.-T. Nguyen and P. Abgrall, *Thermocapillary actuation of droplet in a planar microchannel Microflidics nanofluidics*, 5, 205-214 (2008)

22) Alfonso M. Gañán-Calvo, *Electro-Flow Focusing: The High-Conductivity Low-Viscosity Limit*. Phys. Rev. Lett. 98, 134503-134507 (2007).

23) F. Malloggi, S. A. Vanapalli, H. Gu, D. van den Ende and F. Mugele, *Electro wetting-controlled droplet generation in a microfluidic flow-focusing device*, J. Phys.: Condens. Matter 19, 462101-462108 (2007).

24) E. Menard, M. A. Meitl, Y. Sun, J.-U. Park, D. J.-L. Shir, Y.-S Nam, S. Jeon, and J. A. Rogers, *Micro-and Nanopatterning Techniques for Organic Electronic and Optoelectronic Systems*. Chem. Rev. 107, 1117-1160 (2007)

25) *Ferroelectric Crystals for Photonic Applications, Including Nanoscale Fabrication and Characterization Techniques, Series in Materials Science*, Vol. 91, P. Ferraro, S. Grilli, P. De Natale (Eds.), Springer (Germany) (2008)

26) S. Grilli, L. Miccio, V. Vespini, A. Finizio, S. De Nicola, and P. Ferraro, *Liquid micro-lens array activated by selective electrowetting on lithium niobate substrates, Optics Express* 16, 8084-8093 (2008)

27) P. Ferraro, S. Grilli, L. Miccio, and V. Vespini, *Wettability patterning of lithium niobate substrate by modulating pyroelectric effect to form microarray of sessile droplets, Applied Physics Letters* 92, 213107 (2008).

28) S. Grilli, V. Vespini, P. Ferraro *Surface-charge lithography for direct PDMS micro-patterning, Langmuir* 24, 13262-13265 (2008).

29) B. Rosenblum, Bräunlich, J. P. Carrico, *Thermally stimulated field emission from pyroelectric LiNbO3, Appl. Phys. Lett.* 25, 191974.

30) N. Maeda, J. N. Israelachvili, M. M: Kohonen, *Evaporation and instabilities of microscopic capillary bridges*, PNAS 100, 803 (2003); A. Klingner, J. Buehrle, F. Mugele, *Capillary Bridges in electric fields, Langmuir,* 20, 6770 (2004).

Preferred forms of realization have been described in the preceding and some variations at the present invention have been suggested, but it is to be understood that those skilled in the art will be able to make modifications and changes without thereby falling out from the relevant scope of protection, as defined by the attached claims.

What is claimed is:

1. A method for the controlled distribution of pico- or nano-volumes of a liquid, comprising:

a first step of deposing the liquid as a film or multiple separated sessile drops on a top surface of a starting substrate;

a second step of providing a destination substrate having a bottom surface spaced-apart from the starting substrate, the bottom surface of the destination substrate facing the top surface of the starting substrate; and a third step of varying the temperature of a first pyroelectric substrate, which is one of the starting substrate or the destination substrate and has a surface, to induce a surface charge density σ, such that the liquid on the top surface of the starting substrate, undergoing an electrodynamic force, creates dispensing cones having volume V, wherefrom droplets detach and depose onto the bottom surface of the destination substrate, wherein the bottom surface of the destination substrate is set at a distance D from the top surface of the starting substrate, and the distance D is larger than a critical distance given by the following:

$$Dc=(1+\theta/4)V^{1/3}$$

wherein θ is a contact angle of one of the dispensing cones, and the contact angle is a starting angle of the one of the dispensing cones as measured with respect to the starting substrate, and V is the volume of the liquid of the one of the dispensing cones.

2. The method according to claim 1, wherein the surface charge density σ is given by:

$$\sigma=Pc\Delta T,$$

neglecting losses, wherein Pc is a pyroelectric coefficient of the first pyroelectric substrate and ΔT is a temperature variation of said first pyroelectric substrate.

3. The method according to claim 1, wherein said first pyroelectric substrate is Lithium Niobate z-cut or Lithium Tantalate.

4. The method according to claim 1, wherein varying the temperature is performed on specific regions on the surface of the first pyroelectric substrate.

5. The method according to claim 4, wherein varying the temperature is realized by heating and is performed with an infrared Laser emitting a laser beam.

6. The method according to claim 4, wherein varying the temperature is realized by heating and is performed by a movable heated tip.

7. The method according to claim 1, wherein the first pyroelectric substrate is a functionalized substrate having periodic polarized structures, wherein in the first step of deposing the liquid, the multiple separated sessile drops have been deposed on the periodic polarized structures.

8. The method according to claim 4, wherein in the first step of deposing the liquid, multiple separated sessile drops are deposed on the top surface of the starting substrate, a movable heat source is provided for heating and the movable heat source is moved in such a way that either:

off-the-axis distribution angles of one of multiple separated sessile drops become larger than a threshold value α, that is a function of the liquid in the one separate sessile drop, the starting substrate, and a charge distribution on the first pyroelectric substrate, and the one separated sessile drop moves; or off-the-axis distribution angles of the one separated sessile drop become smaller than said threshold value α, and the one separated sessile drop does not move;

so that the one separated sessile drop creates a dispensing cone having apex angle α.

9. The method according to claim 5, wherein in the first step of deposing a liquid, the multiple separated sessile drops or the film, are deposed on the top surface of the starting substrate and the laser beam is separated in such a way that a plurality of spatially separated beams incide simultaneously on the first pyroelectric substrate, thus creating a simultaneous emission of liquid from the multiple separated sessile drops or from different points of the film.

10. The method according to claim 1, wherein the first pyroelectric substrate is the destination substrate.

11. The method according to claim 10, wherein the first pyroelectric substrate is a micro-engineered LN sample having a plurality of periodic polarized hexagonal dominia, and, in the first step of deposing the liquid, a poly-dimethyl-siloxane (PDMS) layer is first deposed on the starting substrate, whereby a respective one of the sessile drop or multiple separated sessile drops is created at each of the plurality of periodic polarized hexagonal dominia by heating of the first pyroelectric substrate.

12. The method according to claim 1, wherein the liquid is any liquid which reacts to an applied electrical field.

13. The method according to claim 1, wherein the first pyroelectric substrate is the starting substrate.

14. The method according to claim 12, wherein the liquid of the film or the single sessile drop or the multiple separated sessile drops is: almond oil or PDMS.

15. A device for controlled distribution of pico- or nano-volumes of a liquid, comprising:

a liquid;

a first substrate called "starting substrate", having a top surface whereon the liquid is deposed;

a second substrate called "destination substrate" having a bottom surface whereon the liquid is to be distributed, and which is facing the top surface of the starting substrate;

wherein at least one of said starting substrate and said destination substrate is a pyroelectric substrate;

at least one heat source for heating said pyroelectric substrate in order to induce a surface charge density $\sigma$ such that the liquid on the top surface of the starting substrate, undergoing an electro-dynamic force, creates dispensing cones having volume V;

means for setting the bottom surface of the destination substrate at a distance D, from the top surface of the a starting substrate, wherein the distance D is larger than a critical distance given by the following:

$$Dc=(1+\theta/4)V^{1/3}$$

and $\theta$ is a contact angle of one of the dispensing cones, which are created by the heating of the liquid, the liquid of the one of the dispensing cones has a volume V and the contact angle is a starting angle of the one of the dispensing cones as measured with respect to the starting substrate.

16. A device according to claim 15, wherein the starting substrate includes through micro-holes and micro-tubes inserted into the micro-holes for dosing the liquid onto the top surface as respective sessile drops.

17. The device according to claim 15, further comprising electrically insulated spacers located to provide the distance, D, between the bottom surface of the destination substrate and the top surface of the starting surface.

18. A device for controlled distribution of pico- or nano-volumes of a liquid, comprising:

a liquid;

a first substrate called "starting substrate", having a top surface whereon the liquid is deposed; a second substrate called "destination substrate" having a bottom surface, which is facing the top surface of the starting substrate; wherein at least one of said starting substrate and said destination substrate is a pyroelectric substrate;

at least one heat source for heating said pyroelectric substrate in order to induce a surface charge density $\sigma$ such that the liquid on the top surface of the starting substrate, undergoing an electro-dynamic force, creates dispensing cones having volume V;

a third dielectric substrate having a surface, the third substrate being interposed parallel to said second substrate, so as to intercept the liquid being distributed;

means for setting the a distance D, between the top surface of the starting substrate and the surface of the third dielectric substrate, wherein the distance D is larger than a critical distance given by the following:

$$Dc=(1+\theta/4)V^{1/3},$$

and $\theta$ is a contact angle of one of the dispensing cones, which are created by the heating of the liquid, the liquid of the one of the dispensing cones has a volume V and the contact angle is a starting angle of the one of the dispensing cones as measured with respect to the starting substrate.

* * * * *